Nov. 17, 1970 SANRO INABA ET AL 3,540,281
METHOD FOR MEASURING SURFACE TEMPERATURES OF
SYNTHETIC YARN-HEATING ROLLERS
Filed April 1, 1969
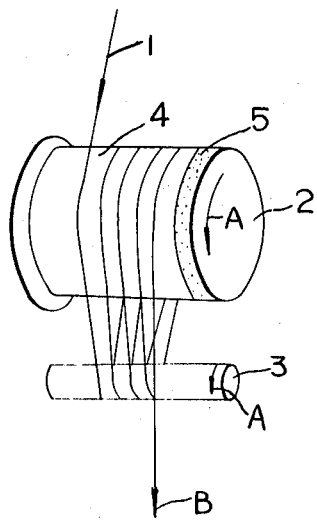
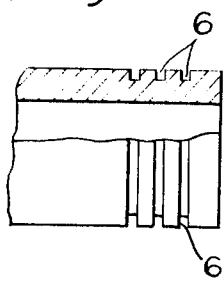
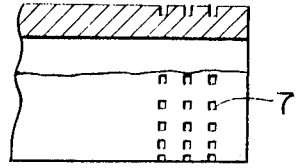
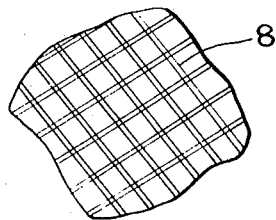
SANRO INABA and WATARU NAKATA,
Inventors
By Wenderoth, Lind & Ponack.
Attorneys United States Patent Office 3,540,281
Patented Nov. 17, 1970

3,540,281
METHOD FOR MEASURING SURFACE TEMPERATURES OF SYNTHETIC YARN-HEATING ROLLERS
Sanro Inaba and Wataru Nakata, Matsuyama-shi, Japan, assignors to Teijin Limited, Umeda, Kita-ku, Osaka, Japan
Filed Apr. 1, 1969, Ser. No. 812,075
Claims priority, application Japan, Apr. 4, 1968, 43/22,308
Int. Cl. G01k 11/06, 13/08
U.S. Cl. 73—351
2 Claims

ABSTRACT OF THE DISCLOSURE

Method of measuring surface temperatures of rollers for heating synthetic filamentary yarn, comprising coarsening a part or the entire portion of the roller surface on which the yarn does not pass, and rubbingly applying a temperature-measuring crayon to the coarsened surface.

---

This invention relates to an improvement in method of measuring surface temperatures of synthetic filamentary yarn heating rollers (which are hereinafter referred to simply as heating rollers).

Conventionally, heated rollers have been used for heating synthetic filamentary yarn. The filamentary yarn is wrapped round such a heating roller, and runs with the roller while maintaining contact with the roller surface to receive the heat. Thereafter the heated yarn is taken onto another roller. The factors governing the heat transfer include surface temperature of the heating roller, r.p.m. of the heating roller, and number of turns of the yarn around the roller, etc. All of those factors excepting the surface temperature of the heating roller can be predetermined and controlled accordingly. However, the first-mentioned factor is extremely variable, and apt to be excessively high or low. Therefore, a controlling device for maintaining the surface temperature at a constant level is required, and the very basic data necessary for accurate control are provided by correct and easy measurement of surface temperatures of the roller.

Thermocouples and thermistors are well known as devices for measuring surface temperatures. In the field of fiber technology also thermocouples and thermistors have been used. That is, the surface temperature of a heating roller is measured by contacting the roller with the temperature-detecting end of a thermocouple or a thermistor. However, it is extremely difficult to secure a uniform or even contact of the detecting end with the curved and furthermore rotating surface of a roller. Thus measured values are subject to considerable variation depending on the state of contact, and accordingly it is difficult to determine the surface temperature accurately.

Since the use of thermistors has encountered such inconvenience and difficulty, a simpler temperature-measuring method has been proposed, which comprises the use of temperature-measuring crayon having a fixed melting point. That is, the crayon is rubbingly applied to a heating body, and the surface temperature of the body is determined by observing whether the crayon dissolves to liquid on the body, or retains the form of white chalk. This method is very simple and the measurement is accurate. However, when the same method is applied to the rollers for heating synthetic fibers, the results are not very satisfactory. The reason is as follows.

The heating rollers employed in drawing and heat-treatment steps of synthetic filamentary yarn are normally given surfaces of a smooth, mirror plane-finish, having a high frictional resistance, in order to prevent the yarn from slipping thereon. When a temperature-measuring crayon is rubbingly applied to such a smooth, mirror plane-finished surface, the amount of the crayon adhered to the latter is extremely small. In fact, it is hardly observable. Consequently the temperature measurement is very difficult and hardly practicable.

This invention relates to an improvement of the above-described temperature-measuring method with the crayon, by which the above drawback is eliminated and accurate temperature indication is obtained.

The object of the present invention is to provide a method for simple and accurate measurement of surface temperatures of synthetic yarn-heating rollers.

According to the invention, a part of the heating roller surface is coarsened, and the crayon is rubbed against the coarsened surface to cause adherence of a suitable amount of the crayon onto the latter, thereby enabling accurate surface temperature measurement by observing the melting status of the adhered crayon.

A working example of this invention is illustrated in the attached drawings, in which:

FIG. 1 is a perspective view of a synthetic yarn-heating roller,

FIGS. 2 and 3 show the heating rollers with coarsened surface portions, partially in section, and FIG. 4 is a plan view showing one embodiment of coarsened surface.

Now the invention will be explained with reference to the drawings.

FIG. 1 shows a heating roller 2 and a separate roller 3, installed at a suitable spacing. Filamentary yarn 1 is wrapped around the two rollers a suitable number of turns, and is withdrawn in the direction of arrow B. The heating roller 2 and separate roller 3 rotate in the direction indicated by the arrow A. As already stated the surface temperadture of heating roller 2 must be maintained at a predetermined level, and for this purpose the actual surface temperature thereof must be accurately measured. According to the invention, the portion 5 on the surface of heating roller 2, on which the yarn 1 does not pass, is coarsened. The coarsened surface may have various configurations. For example, FIG. 2 shows plural narrow grooves 6 formed on the circumferential surface of the heating roller 2, and FIG. 3 shows a large number of small depressions 7 formed on the same portion. Also FIG. 4 shows a large number of narrow grooves 8 intersecting with each other. A particularly favorable result is obtained with the coarsened surface portion being a sand-blasted surface. Such coarse texture finish can be given to any portion of the circumferential surface of the heating roller 2, as long as the portion does not come into contact with the filaments to be heated.

When a temperature-measuring crayon, which is normally referred to as a thermocrayon, is rubbingly applied against such coarse textured surface, the crayon is pressed into the minute depressions on the surface and will not come off easily. In other words, due to the coarsening the crayon adherence onto the roller surface is facilitated. Thus the object of the invention is accomplished, by observation of the melting status of adhered crayon on the heated roller.

As has been described in the above, the main point of this invention is to assure that sufficient crayon adheres to the roller surface. Therefore, the "coarsened surface" must be such that it facilitates the crayon adherence. For example, if wide and shallow grooves are employed as the coarsening means, crayon will not adhere well to such a surface. Similarly shallow depressions will not produce a satisfactory effect. Such unsatisfactory coarse texture surfaces are outside the scope of this invention. The essential requirement for the coarsened surface according to the invention is that the thermocrayon rubbed thereagainst should be sufficiently retained on the surface and will not come off easily. Thus a coarse texture portion meeting this requirement should be formed on the heating roller surface.

According to the practice of this invention, since the thermocrayon adheres to the coarsened portion of the heating roller surface in a sufficient amount, the melting status of the crayon can be very easily observed. Thus simple and accurate measurement of surface temperatures of heating rollers can be accomplished.

We claim:

1. A method for measuring surface temperatures of synthetic yarn-heating rollers, which comprises forming a coarse texture portion on the part of the heating roller surface on which the filaments do not pass, said coarse texture portion being sufficiently rough to enable sufficient adherence of thermocrayon thereto upon rubbing thermocrayon thereagainst, rubbingly applying thermocrayon to the same portion and measuring the surface temperature of the heating roller from the melting status of the adhered crayon.

2. The method of claim 1 in which the coarse texture portion is formed on the surface of the heating roller, on which the filaments do not pass, by sand-blasting.

References Cited

UNITED STATES PATENTS 2,269,038  1/1942  Perry _____ 73—358

FOREIGN PATENTS 1,029,605  1/1966  Great Britain.

OTHER REFERENCES

Princeton Division of Curtiss-Wright Corp. Thermochrom® Crayons DetectoTemp® Paints. Advertising circular No. 3/60–25M. March, 1960. Copy in 73–356.

LOUIS R. PRINCE, Primary Examiner

F. SHOON, Assistant Examiner

U.S. Cl. X.R.

73—356; 116—114.5